United States Patent [19]

Debitsch et al.

[11] Patent Number: 5,138,563
[45] Date of Patent: Aug. 11, 1992

[54] METHOD AND APPARATUS TO CORRECT FOR GRAVITATIONAL SAG IN THE ARTICULATED MOUNTING OF A PROBE IN A COORDINATE-MEASURING MACHINE

[75] Inventors: Rasmus Debitsch, Oberkochen; Eckhard Enderle, Aalen-Dewangen; Helmut Müller, Schwäbisch Gm/ nd Grossdeinbach, all of Fed. Rep. of Germany

[73] Assignee: Carl-Zeiss-Stiftung, Heidenheim/Brenz, Fed. Rep. of Germany

[21] Appl. No.: 641,933

[22] Filed: Jan. 16, 1991

[30] Foreign Application Priority Data

Jan. 19, 1990 [DE] Fed. Rep. of Germany ....... 4001433

[51] Int. Cl.$^5$ .................................................. G01B 3/00
[52] U.S. Cl. .................................. 364/560; 364/571.04
[58] Field of Search ............. 364/571.04, 560, 474.37, 364/513; 33/503, 559, 505

[56] References Cited

U.S. PATENT DOCUMENTS

| | | | |
|---|---|---|---|
| 4,333,238 | 6/1982 | McMurtry | 33/503 X |
| 4,530,062 | 7/1985 | Inaba et al. | 364/513 |
| 4,663,852 | 5/1987 | Guarini | 33/1 M |
| 4,710,884 | 12/1987 | Tokairin et al. | 364/176 X |
| 4,888,877 | 12/1989 | Enderle et al. | 33/559 |
| 5,005,297 | 4/1991 | Aehnelt | 33/559 |
| 5,018,278 | 5/1991 | Aehnelt et al. | 33/559 |

FOREIGN PATENT DOCUMENTS 2938226 7/1980 Fed. Rep. of Germany.

*Primary Examiner*—Dale M. Shaw
*Assistant Examiner*—S. A. Melnick
*Attorney, Agent, or Firm*—Hopgood, Calimafde, Kalil, Blaustein & Judlowe

[57] ABSTRACT

The invention contemplates a technique to correct for measurement error which is attributable to gravitational sag of a probe head (6) mounted to a multiple-axis articulating head (2). To this end, a variable (b) is determined which describes the stiffness of the articulating head (2) and/or of a probe extension (5) mounted thereto, said variable being characteristic for the probe configuration in question and being entered into the memory of the computer of the coordinate-measuring machine. The sag $\bar{B}$ ($\alpha$, $\beta$) which has differing values that depend on actual angular positions ($\alpha$, $\beta$) is then calculated from these angular positions for each of the angular positions, and the calculated sag value is appropriately taken into account in computer-reporting of coordinate-measurement values made by the machine. Calibration of the articulating head in each of the various different angular positions is therefore unnecessary.

10 Claims, 3 Drawing Sheets

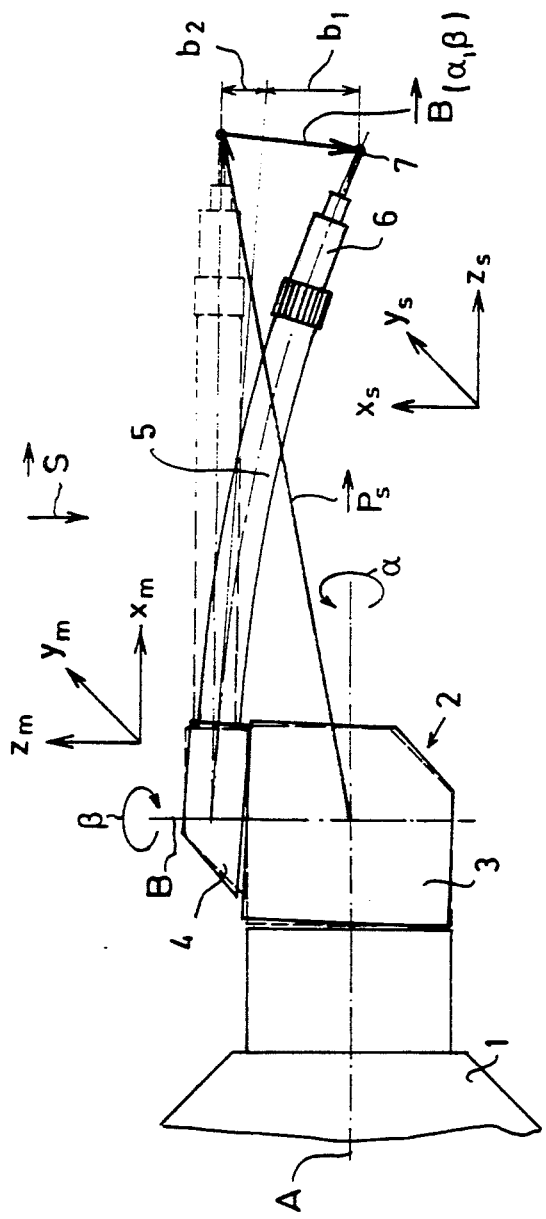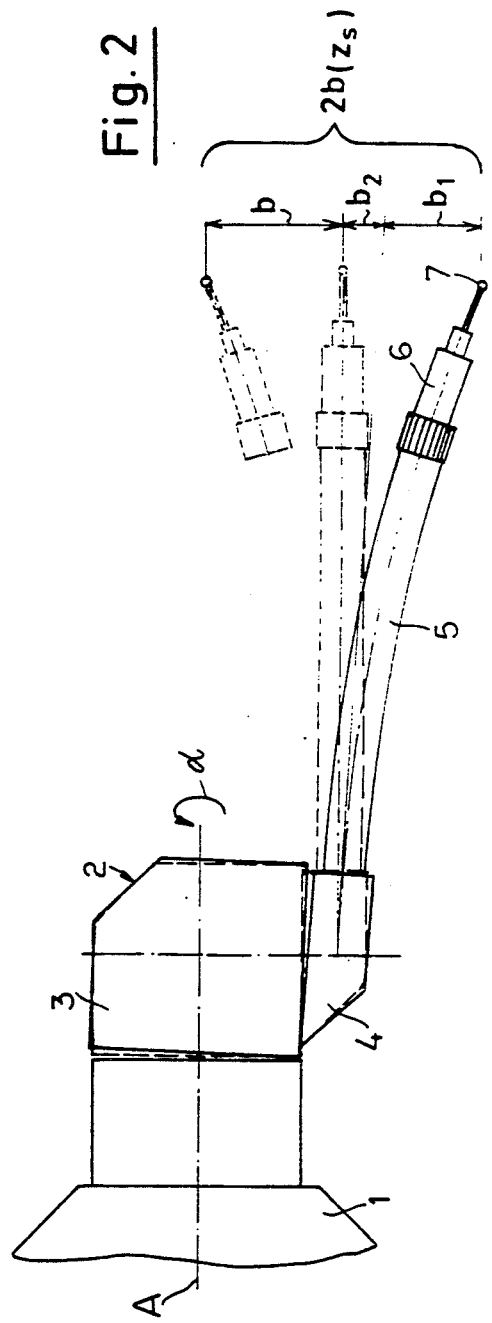

METHOD AND APPARATUS TO CORRECT FOR GRAVITATIONAL SAG IN THE ARTICULATED MOUNTING OF A PROBE IN A COORDINATE-MEASURING MACHINE

BACKGROUND OF THE INVENTION

The present invention relates to a method of determining the actual position of a probe head which is mounted to a coordinate-measuring machine via an articulating head (Dreh-Schwenk-Gelenk) having two orthogonally related axes of articulation.

Such articulating heads serve on coordinate-measuring machines primarily for angularly orienting the probe head used for coordinate-measurement of workpieces, in such manner that the probe head can be optimally used for the desired measurement task, for example, to permit successive entry of a probe into a plurality of holes of different orientation on the workpiece.

Known articulating heads can be divided into two classes: the first class comprises articulating heads of the so-called switching type, in which the probe head (mounted to the articulating head) can be set, via detents, in a limited number of discrete angular positions which differ from each other, for example by about 7.5°. The other class comprises articulation heads of the type which can be adjusted continuously to any desired angle about either or both of their articulation axes and which contain encoders in both axes, for supplying the computer of the coordinate-measuring machine with measurement values corresponding to currently set angular values.

A switching-type articulating head is illustratively described in U.S. Pat. No. 4,313,263, and a measuring-type articulating head is described in German OS 37 40 070, corresponding to U.S. Pat. No. 4,888,877.

A probe head that is positioned via a two-axis articulating head may be mounted to the articulating head either directly or via an extension piece. In either event, the position of the probe head or, rather, the position of the work-contacting ball at the tip end of a probe pin mounted to the probe head, must be known very precisely in all angular positions, if very precise coordinate measurements are to be effected. But such parts can sag within a range of several times 10 $\mu$m, due to their own weight. As long as the angular position of the probe and of its probe extension remains unchanged, the amount of sag is constant and therefore does not affect the coordinate measurement on the workpiece, which, after all, is always a relative measurement. But it is unrealistic to expect such a condition during the operation of a probe head mounted to an articulating head, because the whole point of an articulating head is to bring the probe into different angular positions; the amount of the sag will therefore change, depending, for example, upon whether the probe head is oriented horizontally or vertically. In the latter case, the sag is practically zero. In the former case, on the other hand, the sag may assume values in the order of magnitude of up to 180 $\mu$m.

Until now, and in particular for articulating heads of the switching type, it has been customary, before making a measurement with a newly inserted probe head, to follow a calibration procedure in which the existing probe coordinate, i.e., the position of the probe-pin ball mounted to the probe head, is determined and digitally stored for all angular positions required in the course of the measurement program to be followed. In this way, the influence of gravity on the position of the probe, i.e., the effect of sag due solely to the weight of the probe head and of its extension is automatically determined. Such a method of calibration is, however, very time-consuming and cumbersome, since the position of the probe head must be redetermined in each angular position of the articulating head, by making repeated contact with a calibration ball, and performing associated operations involved in setting up the ball for such calibration.

It is known from U.S. Pat. No. 4,663,852 that, for a work-contacting probe carried by the measurement arm of a coordinate-measuring machine, (1) probe-pin deviations attributable to a bending of the measurement arm, with respect to a reference line or plane, may be detected by attached inclinometer instrumentation, and (2) that measurement values from the inclinometer instrumentation can be used to correct current instantaneous probe head or probe-pin ball measurement values. This method, however, cannot be employed when the angular orientation of the part in question is to be intentionally variable, as for example in the case when using a two-axis articulating head. Furthermore, it is not readily possible or practical to install one or more sensors in a probe head in order to measure instantaneous inclination.

EP 0,147,529 (corresponding to U.S. Pat. No. 4,611,156) teaches that one may correct for such bending deflections of the probe pin of a probe head as may occur in measurement made in a scanning procedure, wherein the bending deflections are a function of scanning speed and/or of differences of materials, and these factors are taken into account. But this known technique is also not adapted to correcting for such deviations in position of the probe-pin ball as are attributable to sag that is dependent on instantaneous angular orientation and position of the probe head.

BRIEF STATEMENT OF THE INVENTION

The object of the present invention is to provide a method and means of determining the instantaneous position and orientation of a probe head which is mounted to a coordinate-measuring machine via a two-axis articulating head, which method makes it possible to correct for such changes in probe position as result from the probe head sagging under its own weight, the correction being made as rapidly and simply as possible without involvement of time-consuming calibrations for required successive angular reorientations of the probe.

The invention achieves this object by ascertaining and digitally storing a variable, which describes the stiffness of the two-axis articulating head or of the attachment or extension element connecting it to the probe head; by then calculating a correction value which describes the sagging of the two-axis articulating head or of the extension element under the influence of gravity, the calculation being made (a) for the actual angular positions about the respective axes ($\alpha$, $\beta$) of the articulating head, wherein the actual angular positions apply for the probe-head orientation of the actual part in a desired measurement program, and (b) from the variable which describes the stiffness; and by using the correction values to correct position-measurement values (x, y, z) resulting from work-contacting probe-head use of the coordinate-measuring machine.

The method of the invention makes it possible to calibrate the two-axis articulating head in a very limited number of angular positions— and possibly in only a single angular position— and to calculate the sag on basis of its own weight in all other angular positions in which measurement is effected. The method is therefore particularly suitable in application to a measuring-type articulating head, which can be continuously set in any desired angular position. Furthermore, a considerable reduction of the total measurement time can also be obtained in application to a switching-type articulating head, because the method of the invention makes it possible to dispense with the indicated time-consuming calibration processes for as many as 720 different discrete angular positions of the articulating head.

The most accurate results are obtained if the flexural behavior of the entire arrangement, consisting of articulating head, extension piece and attached probe head, is taken into consideration, and if the value which describes the stiffness of the entire structure is accordingly calculated or determined and is then used in correction of coordinate-measurement values. In many cases, particularly if individual components, such as the probe head or the articulating head are themselves sufficiently stiff, it may be sufficient merely to take the flexural behavior of the extension piece into account.

The value which is characteristic of the stiffness can be determined in various ways. Thus, it is possible, for example, to calculate the stiffness tensor from physical data (Materialdaten) and from geometric dimensions of the probe-head extension, and possibly also of the articulating head, by the method of finite elements. Furthermore, it is possible to determine the value of the stiffness characteristic by means of a testing device, by deliberately loading the articulating head (with attached probe head) and by measuring the resultant deformation.

The value of the stiffness characteristic can also be determined during the course of a calibration procedure, by means of the coordinate-measuring machine itself. For this, it is merely necessary for the position of the probe head or of the probe ball to be measured in two different angular positions, for example, in its vertical and in its horizontal alignment orientations.

In the event that measurement is frequently effected with different probe configurations mounted to the articulating head, it is advisable to predetermine the values that are characteristic for the stiffness of each of these configurations, and to store them in the memory of the computer of the coordinate-measuring machine.

DETAILED DESCRIPTION

The invention will be described in further detail in conjunction with the accompanying drawings, in which:

FIG. 1 is a simplified sketch which shows a two-axis articulating head with attached probe head in a first angular position;

FIG. 2 is a simplified sketch which shows the articulating head and the probe head of FIG. 1 in a second angular position, involving a 180° displacement about axis A of FIG. 1;

Figure 3:
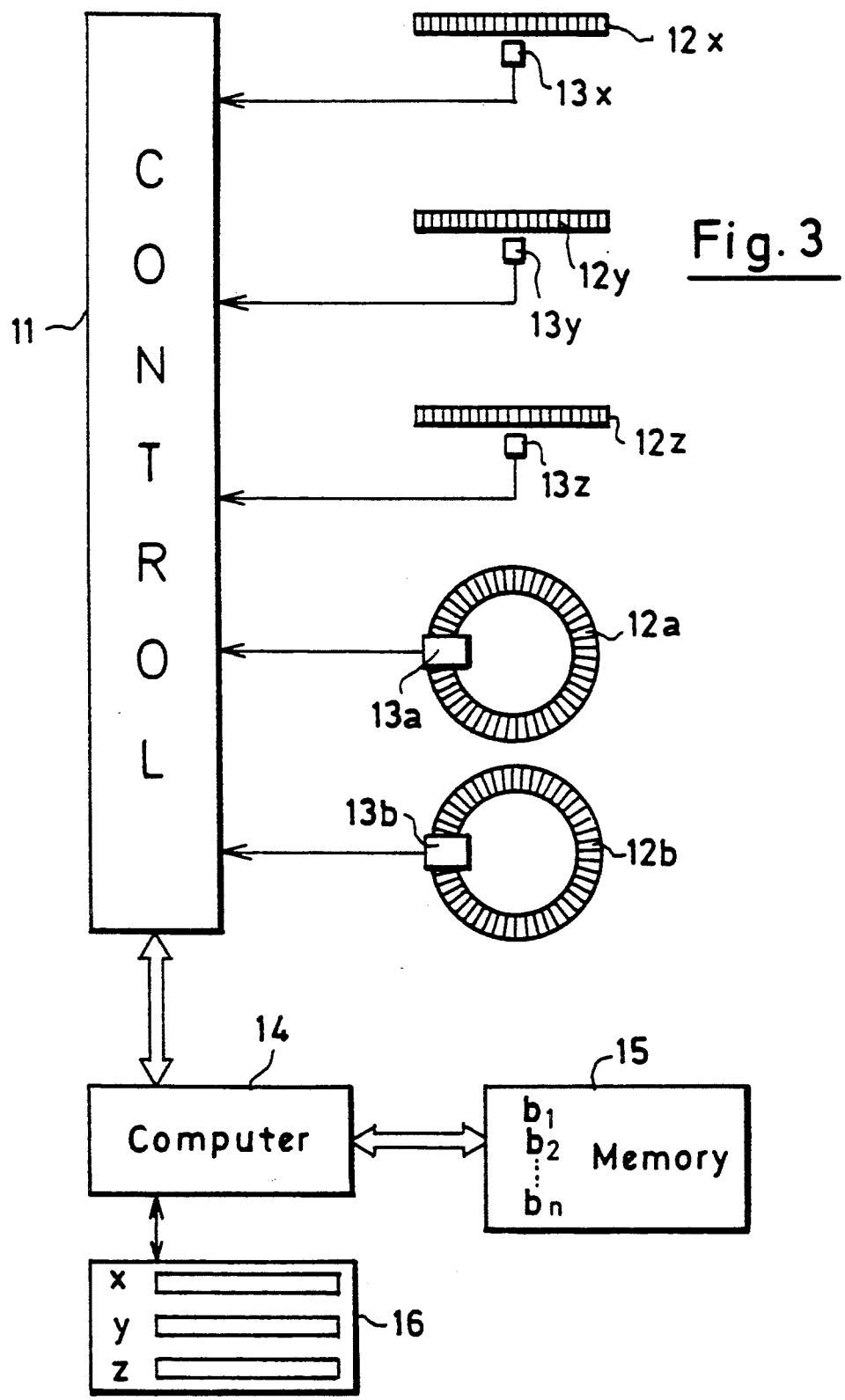
Figure 4:
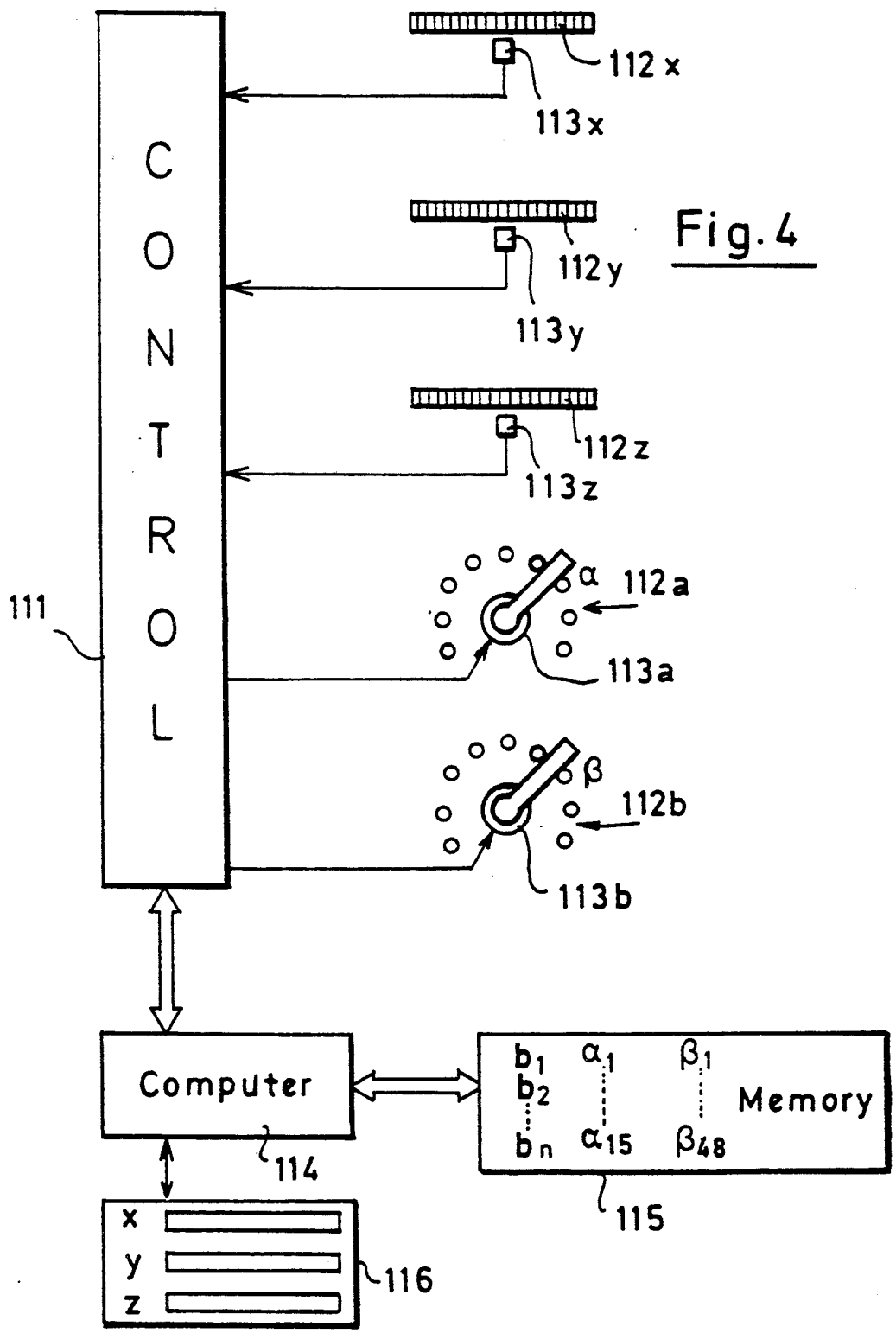

FIG. 3 is a simplified block diagram of the measurement systems of a coordinate-measuring machine, equipped with a measuring-type articulating head, suitable for performing the method of the invention; and FIG. 4 is a simplified block diagram of the measurement systems of a coordinate-measuring machine, equipped with a switching-type articulating head, suitable for performing the method of the invention.

In FIG. 1, a chucking receiver 1 on the measurement arm of a coordinate-measuring machine is shown mounting a two-axis articulating head 2. The articulating head 2 consists, basically, of two parts 3 and 4 which are rotatable about two orthogonally related axes A and B, to any desired angular positions $\alpha$ and $\beta$, respectively.

The articulating head will be understood to include, in the two axes A and B, encoders for the continuous measurement of instantaneous angular position. For detailed description of the articulating head 2, reference is had to said German OS 37 40 070 (U.S. Pat. No. 4,888,877), which is hereby incorporated by reference.

The probe head 6 of the coordinate-measuring machine is mounted to part 4 of the articulating head via an extension piece 5, and it will be understood that ball 7 at the tip of the probe pin of probe head 6 is the actual workpiece-contacting element, and that the position of ball 7 in the coordinate system of the measuring machine is to be ascertained with high accuracy.

The individual weights of the individually rotatable parts 3 and 4 of the articulating head 2, including play in their bearing suspensions (not shown), as well as the weight of extension piece 5, and even of the probe head 6 or probe pin, collectively contribute to a total sagging deformation, shown with solid lines and with exaggeration in FIG. 1, as compared with the ideal straight alignment that is shown in dashed lines. The resultant sag b of the probe ball comprises of a portion $b_2$ which is the result of a deflection that is attributable to components of the articulating head per se, and a portion $b_1$ which results from a sagging bend of the probe extension 5. If this sag b is not taken into account in the measurement, then, depending on the angular position, errors of up to the magnitude $2b$ can occur, and these errors are dependent on angular orientation about the rotary axes A and B. This is sketched by way of example in FIG. 2. If the articulating head 2 were calibrated in the position shown in FIG. 1 and then rotated about axis A by the angle $\alpha = 180°$, then the actual position of the probe ball in the position shown in solid line in FIG. 2 differs by the amount $2b$ in the direction of the gravity vector $\vec{S}$ from the position (shown in short dashed lines) which was calculated on the basis of the calibration data.

With a skewed orientation of the probe head 6, (e.g., for orientation of probe head 6 out of the vertical plane of axis A, as by less than 180° of rotation about axis A and/or axis B) other, smaller values for the sag result because, in this case, the effective lever length is shortened with respect to the gravity vector.

In order to avoid a recalibration for the different angular positions, one now proceeds by relying on a mathematical model which describes the movement of the measuring probe ball 7 in the coordinate system of the coordinate-measuring machine, with due accounting for gravitational sag. The original mathematical model has the form $$\vec{P} = \vec{X}_m + D(\alpha,\beta) \cdot \vec{P}_S + \vec{V}(\alpha,\beta) \tag{1}$$

Aside from a somewhat different designation of the variables, this form corresponds to Equation I in said German OS 3,740,070 (U.S. Pat. No. 4,888,877) in which $\vec{X}_m$ is the three-dimensional measurement value of the scales of the coordinate-measuring machine, $(\alpha,\beta)$ is the two-dimensional (angular) measurement value of the articulating head, $\vec{P}_S$ is the probe coordinate in a coordinate system ($X_s$, $Y_s$, $Z_s$), which is associated with the probe head, $D(\alpha,\beta)$ is the matrix which describes rotary displacement about the respective axes of the articulating head, and $\vec{V}(\alpha,\beta)$ is a vector which describes translational displacement of the probe-coordinate system $(X_s, Y_s, Z_s)$ upon rotation about the axes A and B.

The vector $\vec{P}$ represents the three-dimensional measuring point, i.e., the position of the center of the probe ball 7 in the coordinate system of the coordinate-measuring machine. This measurement $\vec{P}$ is further processed by the computer of the coordinate-measuring machine.

Formally, equation (1) can be expanded by a term $\vec{B}(\alpha,\beta)$ which describes the sag of the probe having the probe coordinate $\vec{P}_s$, as a function of angular position $(\alpha,\beta)$, namely:

$$\vec{P} = \vec{X}_m + D(\alpha,\beta) * \vec{P}_x + \vec{V}(\alpha,\beta) + \vec{B}(\alpha,\beta) \quad (2)$$

At this point, reference is again made to the showing of FIG. 1.

Aside from the variables $\vec{P}_s$ and $\vec{B}(\alpha,\beta)$, which have by now been ascertained, FIG. 1 also shows the coordinate system $(X_m, Y_m, Z_m)$ of the coordinate-measuring machine, the coordinate system $(X_s, Y_s, Z_s)$ of the probe head, and the gravity vector $\vec{S}$. If the flexure tensor for the probe head and its extension for a given angular position $(\alpha, \beta)$ of the articulating head and the gravity vector $\vec{S}$ are known, then the sag $\vec{B}(\alpha,\beta)$ can be calculated for any desired angular position. If the flexure tensor is written as $T(\alpha,\beta)$, we have:

$$\vec{B}(\alpha,\beta) = T(\alpha,\beta) * \vec{S} \quad (3)$$

The tensor $T(\alpha,\beta)$ can be calculated in simple fashion by means of the transformation matrix $D(\alpha,\beta)$ for any desired angular position. Corresponding descriptions are contained, for example, in the textbook "Tensorrechnung fur Ingenieure" (Tensor Calculation for Engineers), by J. Betten, published by Teubner, Stuttgart 1987.

Since exact determination of the flexure tensor $T(\alpha, \beta)$ and of the gravity vector $\vec{S}$ requires a considerable amount of computation, it is advisable to make the following simplifying assumptions if the bending/sag correction is to be performed "on-line" during a given program of coordinate measurements:

A. The gravity vector $\vec{S}$ points in the direction $-Z_m$ in the coordinate system $(X_m, Y_m, Z_m)$ B. The probe head 6 and its extension 5 form a line. The direction of this "linear" probe head is always $Z_s$ in the probe-head coordinate system $(X_s, Y_x, Z_s)$.

C. The $(X_s, Y_s)$ coordinates of $\vec{P}_s$ are other than zero since the coordinate origin of the system $(X_s, Y_s, Z_s)$ lies in the middle of the articulating head. The $Z_s$ component of $\vec{P}_s$ is always greater than zero and is a measure of the "active" bending length of the probe head.

D. For each bending length $Z_s$ of a probe head (6), with or without an extension (5), the amount of the maximum sag $b(Z_s)$, i.e., the maximum length of $\vec{B}(\alpha,\beta)$ is known for all angular values $(\alpha, \beta)$. The maximum sag is assumed when the gravity vector $\vec{S}$, as shown in FIG. 1, is perpendicular to the probe direction $Z_s$. The length of $Z_s$ is known via the probe coordinate $\vec{P}_s$.

E. The amount of the sag is equal to the product of $b(Z_s)$, times the sine of the angle between gravity vector $\vec{S}$ and $Z_s$.

With these assumptions, concrete formulas can be derived for the calculation of $\vec{B}(\alpha,\beta)$ and can be programmed on the computer of the coordinate-measuring machine. Furthermore, the maximum sag $b(Z_s)$ can be determined with relative simplicity.

The simplifying assumptions A to E are satisfied for all presently known coordinate-measuring machines having a two-axis articulating head. They permit a simple calculation of the correction of the sag $\vec{B}(\alpha, \beta)$, wherein the following abbreviations are now used:

$f(\alpha,\beta)$ = the amount of sag for any given angular orientation $(\alpha,\beta)$. We note that $f(\alpha,\beta)$ is greater than or equal to zero.

$\vec{C}(\alpha,\beta)$ = the direction vector of the sag for the given angular position $(\alpha, \beta)$. The length of $\vec{C}(\alpha,\beta)$ is equal to one.

$\vec{R}(\alpha, \beta)$ = the direction vector of the probe in the given angular position $(\alpha,\beta)$ in the coordinates $(X_m, Y_m, Z_m)$. The length of $\vec{R}(\alpha,\beta)$ is equal to one.

From the foregoing, the following formulas result:

$$\vec{C}(\alpha,\beta) = \vec{R}(\alpha,\beta) \times \vec{S} \times \vec{R}(\alpha, \beta) / c$$

$$c = \| \vec{R}(\alpha, \beta) \times \vec{S} \times \vec{R}(\alpha, \beta) \|$$

c is the length of twice the cross product $$\vec{R}(\alpha,\beta) \times \vec{S} \times \vec{R}(\alpha, \beta)$$

$$f(\alpha, \beta) = b(Z_x) * \text{sine (angle between } \vec{S} \text{ and } \vec{R}(\alpha, \beta))$$

$$R(\alpha,\beta) = D(\alpha,\beta) * \begin{pmatrix} 0 \\ 0 \\ 1 \end{pmatrix}.$$

If $(d_{ij})_{i,j=1,2,3}$ are the components of the matrix $D(\alpha, \beta)$ describing the rotary movement, and if assumption A (above) is used, the cross product and thus the sag can be calculated directly from the components of the rotation matrix $D(\alpha, \beta)$:

$$B(\alpha,\beta) = b(z_s) * \begin{pmatrix} d_{13} \cdot d_{33} \\ d_{23} \cdot d_{33} \\ d_{33}^2 - 1 \end{pmatrix} \quad (3)$$

Since the length c is thus equal to the length $f(\alpha, \beta)$, the formula constitutes a considerable simplification.

The maximum sag $b(Z_s)$ which is dependent on the distance $(Z_s)$ of the probe ball (7) from the articulating head (2) can, as already mentioned at the start, be determined by different methods.

Here, for example, one proceeds first by calibrating the probe coordinates, i.e., the coordinates of the center point of the probe ball (7), for the articulating-head orientation shown in FIG. 1, and then a test specimen is measured in this direction, within the volumetric measurement capacity of the coordinate-measuring machine. The same test specimen is then measured again, for the case in which the articulating head has been rotated into the relationship shown in FIG. 2.

The two measurements give different values, and the distance between the center points of the test specimen (for these two measurements) corresponds to the value $2b$ for this probe configuration of the length $Z_s$.

One now proceeds, for the different probe configurations of different length and geometry used on the coordinate-measuring machine, by determining their values $b(Z_s)$ and by entering the same in the memory of the computer of the coordinate-measuring machine. The computer then corrects the measurement value supplied by the measurement systems of the coordinate-measuring machine in any angular orientation of the articulating head, by calculating the sag $B(\alpha,\beta)$ in accordance with equation (3), angle data from the encoders of the articulating head, and this calculated sag $B(\alpha,\beta)$ is then used to form the position-measurement value $\vec{P}$, pursuant to equation (2).

FIG. 3 is a simplified block diagram to illustrate the involved process. In FIG. 3, 12(x, y and z) are the three scales of the coordinate-measuring machine and 13(x, y and z) are the corresponding reading heads, the signals of which are fed to the control means (11) of the coordinate-measuring machine. The control means 11 also has connections to the the reading heads 13a and 13b which scan the graduated circles 12a and 12b of the $\alpha$ and $\beta$ angle encoders in the articulating head. The control means (11) transfers the measurement values via a data bus to the computer (14) of the coordinate-measuring machine; in addition to further correction values concerning in particular any non-linearity of the guides of the coordinate-measuring machine, the memory (15) of the coordinate-measuring machine also contains the correction values $b_1$ to $b_n$ for the maximum sag of the different probe combinations to be used.

If the coordinate-measuring machine calculates the position of the scanning points on the object to be measured, the corresponding value (b) is read out of the memory, multiplied in accordance with equation (3) by the angle values which describe the orientation of the probe head 6 in space; calculation-based corrective change in position of the probe ball (7) due to gravity in the z-direction is also taken into account in the calculation of the scanning coordinate. The result is then displayed at an output unit 16.

The embodiment shown in FIG. 3 is based on a coordinate-measuring machine which has an articulating head of the measuring type. And the described method can also be carried out in the same way with an articulating head of the switching type. To illustrate, reference is made to the second block diagram, namely, that of FIG. 4. In FIG. 4, the scales of the coordinate-measuring machine are designated 112(x, y and z). The switching-type articulating head is provided, for each of its two axes of rotation, with detents (112a, 112b) which establish given angular positions and to which the articulating head can be set by means of drives (113a,113b). The corresponding angle values ($\alpha_1$ to $\alpha_{15}$, and $\beta_1$ to $\beta_{48}$) which belong to the 15 different positions of the rotation angle $\alpha$ and to the 48 different positions of the swivel angle $\beta$ (and therefore, to the total of 720 different notch positions) will have in this case been obtained in advance in a calibration process and will have been stored in the memory (115) of the computer (114) of the coordinate-measuring machine. The correction values $b_1$ to $b_n$ which describe the maximum sag for the different probe combinations are also stored in this memory (115).

Here, one proceeds in the manner that, before each scanning operation, the product of the corresponding angle position times the correction value (b) is formed for the specific probe and is then available for the correction of the position-measurement values obtained in the course of a scanning procedure.

What is claimed is:

1. A method of correcting for the instantaneous sag condition of a probe head (6) mounted to a computer-controlled coordinate-measuring machine via a two-axis articulating head, comprising the steps of first determining, then entering into the control computer (14) of the coordinate-measuring machine a variable (b) which describes the stiffness of the articulating head (2) or of the extension element (5) connecting the probe head (6) to said articulating head, for each measurement process within an overall procedure of determining position values $\vec{P}$ of a probe head relative to a work-piece by using the coordinate-measuring machine, calculating a correction value $\vec{B}(\alpha, \beta)$ from the angle positions $(\alpha, \beta)$ of the respective axes of the machine joint set for each of the respective measurement processes and the stiffness variable (b) wherein said correction value $\vec{B}(\alpha, \beta)$ is representative of actual sag of the articulating head or of the extension element (5) under the influence of gravity $\vec{S}$, and correcting the position measurement values $\vec{P}$ for the probe head supplied by the coordinate-measuring machine by the respective correction values.

2. A method according to claim 1, wherein the variable (b) is first of all determined mathematically.

3. A method according to claim 1, wherein the variable (b) is determined in the course of a calibration procedure with the aid of the coordinate-measuring machine.

4. A method according to claim 1, wherein the variable (b) is determined on a separate measuring device.

5. A method according to claim 1, wherein the variable (b) is a tensor.

6. A method according to claim 1, wherein the value of the variable (b) is determined for each of a plurality of different probe configurations and said values are stored in the memory (15) of the computer (14) of the coordinate-measuring machine.

7. A coordinate-measuring machine for performing the method of any one of claims 1 and 2 to 5, said machine comprising a linear scale 12 (x, y, x) for each of three orthogonal displacement directions in space nd a position transmitter 13(x, y, z) associated with each of these displacement directions, a two axis articulating head (2) of the measuring type with encoders (12a/13a, 12b/13b) which develop electrical signals indicative of angular position ($\alpha$, $\beta$) about the respective axes of the articulating head;

at least one probe head (6) mounted to the articulating head (2) by means of an extension piece (5), a computer (14) which, from the values of the position transmitters and of the encoders, is programmed to calculate the position in space of the probe head or of a work-contact probe ball (7) carried thereby; and a memory (15) in which correction values are entered; said machine being further characterized by the fact that correction values (b) describe the stiffness of the articulating head (2) and/or of the extension piece (5) and that, within the computer (14) a correction program is provided to calculate, from the correction values (b) and from the angle values of the encoders, gravitational sag $\bar{B}(\alpha, \beta)$ of the articulating head and of the extension piece and to correct machine-made measurements of the position of the probe head (6) or of the probe ball (7), said correcting being in the amount of the calculated sag $\bar{B}(\alpha, \beta)$.

8. A coordinate-measuring machine for performing the method of any one of claims 1 and 2 or 5, said machine having a linear scale 12(x, y, z) for each of three orthogonal directions in space and a position transmitter 13(x, y, z) associated with each of these displacement directions;

a two-axis articulating head (2) of the switching type, said articulating head being to a finite number of fixed angle values $(\alpha, \beta)$ about each of said axes;

at least one probe head (6) mounted to the articulating head (2) by means of an extension piece (5);

a computer (14) which determines the position in space of the probe head and/or of an associated probe ball, said position in space being determined form the values of the position transmitters; and a memory (115) containing entries of settable angle values of the articulating head as well as correction values uniquely applicable to the respective settable angle values.

9. In a work-contacting use of a computer-controlled coordinate-measuring machine wherein a probe head (6) is mounted to said machine via a two-axis articulating head, the method of correcting for the instantaneous sag condition of the probe head, which method comprises the steps of determining and entering into the computer (14) of the coordinate-measuring machine a variable (b) which describes the stiffness of the articulating head and of the probe head (6) and of its means (5) of supported connection to the articulating head;

calculating, from articulating-head angle positions $(\alpha, \beta)$ that have been set for the measurement procedure, and from the variable (b) which describes said stiffness, a correction value $\bar{B}(\alpha, \beta)$ which describes the gravitational sag of the articulating head or of its means (5) of supporting connection to the probe head (6); and using said correction value to correct position-measurement values $\bar{P}$ resulting from work-contacting probe operation of the coordinate-measuring machine.

10. A coordinate-measuring machine having mounting means for supporting a workpiece-contacting probe and for linearly displacing said mounting means in each of three orthogonal directions in space, said mounting means including an articulating head (2) with two orthogonally related axes of articulation or supporting a probe head and probe in any angular position $(\alpha, \beta)$ about the respective axes of the articulating head, and a computer (14) connected for response to instantaneous linear positional data in each of aid three orthogonal positions in space and for response to instantaneous angular positional data about each of the respective axes (A, B) of the articulating head (2), said computer being programmed for calculating coordinate-measurement values for the position in space of a work-contact probe ball (7) mounted to the probe head (6);

said computer having a memory (15) for storing correction values (b) which collectively describe the stiffness of the articulating head (2) and of the probe head as mounted to the articulating head; and said computer being further programmed with a correction program for calculating, from the correction values (b) and from instantaneous values of the angular positional data, the instantaneous value of gravitational sag $\bar{B}(\alpha, \beta)$ of the probe ball (7) with respect to said mounting means, said correction program operating upon the calculated coordinate-measurement values for calculating corrected coordinate-measuring values pursuant to the calculated instantaneous value of gravitational sag $\bar{B}(\alpha, \beta)$.

* * * * *